United States Patent [19]

Roman

[11] Patent Number: 4,573,566
[45] Date of Patent: Mar. 4, 1986

[54] DUAL STROKE TRANSFER DRIVE

[75] Inventor: Horst L. Roman, Sterling Heights, Mich.

[73] Assignee: The Cross Company, Fraser, Mich.

[21] Appl. No.: 570,666

[22] Filed: Jan. 13, 1984

[51] Int. Cl.⁴ .............................................. B65G 47/31
[52] U.S. Cl. ..................... 198/461; 74/89.15; 74/424.8 R; 269/60; 269/61; 414/750; 198/750
[58] Field of Search ............... 198/461, 792, 750, 741, 198/846, 742; 74/89.15, 424.8 R, 412 TA; 269/60, 61; 414/750; 104/67

[56] References Cited

U.S. PATENT DOCUMENTS

| | | | |
|---|---|---|---|
| 2,789,683 | 4/1957 | Stahl | 104/167 |
| 3,301,374 | 1/1967 | Proctor | 198/792 X |
| 3,361,250 | 1/1968 | Pierce et al. | 198/464 X |
| 3,766,790 | 10/1973 | Weir | 74/89.15 |
| 4,291,586 | 9/1981 | Buetmeister | 74/89.15 X |
| 4,425,814 | 1/1984 | Dick | 74/89.15 |
| 4,449,885 | 5/1984 | Hertel et al. | 414/750 |

FOREIGN PATENT DOCUMENTS 90244 7/1980 Japan .............. 74/424.8 R

Primary Examiner—Joseph E. Valenza
Assistant Examiner—Michael Stone
Attorney, Agent, or Firm—James O. Skarsten

[57] ABSTRACT

In a ball screw transfer drive for a transfer machine, first and second carriages are translated by rotation of a ball screw, the ball screw being actuated by a DC electric or other type of variable speed motor through a ball screw drive train. The first carriage is coupled to the ball screw through a first ball nut which is immovably joined to the first carriage and which has threads in engaging relationship with threads of the ball screw. The second carriage is coupled to the ball screw through a second ball nut which is journaled in bearings attached to the second carriage, threads of the second ball nut likewise being in engaging relationship with the ball screw. A power transmission train is mounted between the ball screw and the second ball nut to rotate the second ball nut during a specified rotation of the ball screw to maintain a pre-specified relationship between the speeds of translation of the first and second carriages during the specified ball screw rotation. During the specified rotation, the first and second carriages, respectively, drive first and second workpiece transfer devices mounted in the transfer machine.

11 Claims, 7 Drawing Figures

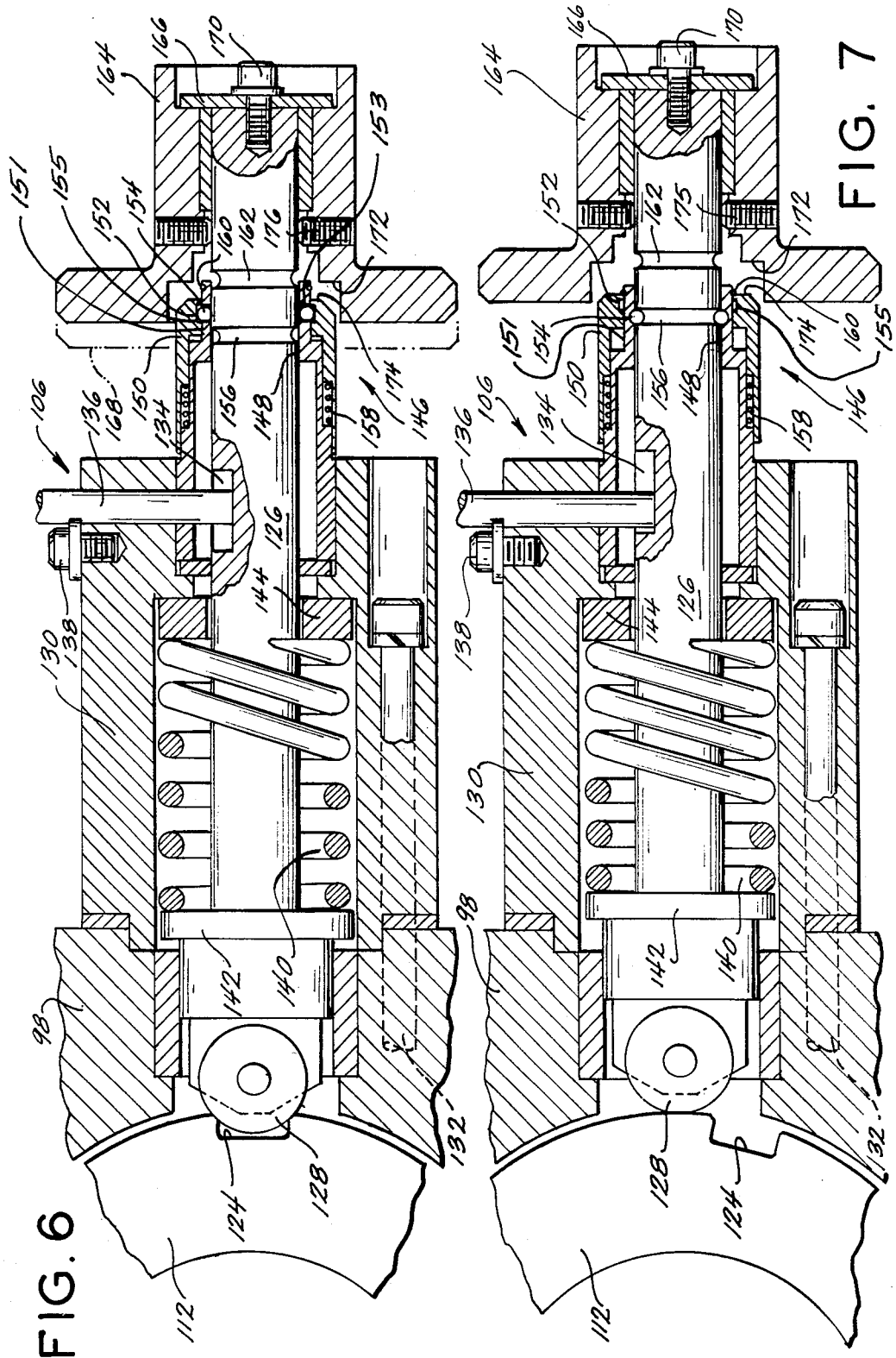

DUAL STROKE TRANSFER DRIVE

BACKGROUND OF THE INVENTION

The invention disclosed and claimed herein generally pertains to transfer drive apparatus, that is, apparatus for driving workpiece transfer mechanisms in transfer machines or the like, wherein the apparatus includes a screw and nut mechanism as a principal power transmission element. More particularly, the invention pertains to such transfer drive apparatus wherein a single ball screw operates to simultaneously move different workpieces through distances which are substantially different. Even more particularly, the invention pertains to a transfer drive apparatus of the above type which includes a torque overload disconnect device to protect the ball screw and motor.

In one very useful type of transfer mechanism for a transfer machine, one or more transfer bars are moved forwardly and backwardly by a transfer drive, one forward and one backward movement taking place during each cycle in a succession of transfer cycles. Workpieces are engaged by the bars at various points along their lengths prior to forward movements, and are disengaged therefrom prior to backward movements. Thus, each of the workpieces is progressively moved along a succession of work stations of the transfer machine and processed thereby. A workpiece transfer mechanism of this type is shown, for example, in U.S. Pat. No. 3,361,250, entitled "Mechanical Transfer", which issued Jan. 2, 1968, to Mr. Guy Donald Pierce. Such patent is assigned to The Cross Company, assignee of the present application.

In transfer mechanisms of the above type, the transfer drive must often be capable of moving the transfer bars so that the accelerations and velocities thereof closely follow specified profiles during successive forward and backward movements, or strokes. For example, it may be very desirable or necessary to accelerate transfer bars from zero velocity to a maximum velocity in a very short time at the beginning of each forward and backward stroke, and to thereafter drive the bars at a constant velocity until just before the ends of the strokes. Thereupon, the bars are decelerated so that their velocities reach zero just when the strokes conclude.

By employing a DC electric or other type of variable speed motor as the power source in a transfer drive, the accelerations and velocities of respective transfer bars can be closely controlled, by controlling rotation of the output shaft of the motor. In turn, rotation of the output shaft may be controlled by regulating the electrical input to the motor. Usefully, the motor rotates a ball screw which engages a ball nut immovably joined to a carriage structure or the like, which is mounted for reciprocating or translational movements. The transfer bars may be directly linked to the carriage structure, so that they will move backward and forward with the same velocity and acceleration which is imparted to the carriage structure and the ball nut by the ball screw.

Frequently, the transfer mechanism of a transfer machine must be capable of moving different workpieces over distances which are quite different from one another during the same transfer cycle. Consequently, a transfer mechanism may be provided with two transfer bars, or pairs of bars, which are driven so that their respective displacements during the transfer cycle are likewise different. Through his invention, the inventor provides a transfer drive for such transfer mechanisms, wherein the drive includes a DC electric or other type of variable speed motor as the power source, and further includes a screw and nut mechanism as a key power transmission element. Usefully, a disconnect feature is provided for preventing a torque overload from being placed upon the mechanism, which may comprise a ball screw and associated ball nuts.

SUMMARY OF THE INVENTION

In the present invention, apparatus for transferring workpieces between work stations in a succession of work stations is provided with a ball screw which is mounted for controllable clockwise and counterclockwise rotations. The apparatus is further provided with first and second carriage means, each of the carriage means being mounted for reciprocating or translational movements. A first ball screw coupling means is mounted to transmit power from the ball screw to the first carriage means to selectively translate the first carriage means in response to a specified rotation of the ball screw. In like manner, a second ball screw coupling means is mounted to transmit power from the ball screw to a second carriage means to selectively translate the second carriage means in response to the same specified ball screw rotation. A first workpiece displacement means, connected to the first carriage means, moves one group of the workpieces a specified first distance when the first carriage means is translated in response to the specified rotation of the ball screw. Simultaneously, a second workpiece displacement means, connected to the second carriage means, moves a different group of the workpieces a specified second distance, which is selectively different from the first distance.

Preferably, the first and second carriage means include first and second carriages, respectively, which are both mounted for translational movements in parallel relationship with the axis of the ball screw. The first ball screw coupling means includes a first ball nut which is immovably joined to the first carriage, threads of the first ball nut and of the ball screw being in engaging relationship. Rotation of the ball screw thereby results in translational movement of the first carriage. The second ball screw coupling means includes a second ball nut which is mounted for rotation upon the second carriage, threads of the second ball nut and of the ball screw also being in engaging relationship. The second ball screw coupling means further includes a power transmission train which is mounted between the ball screw and the second ball nut for transmitting power from the ball screw to rotate the second ball nut, whereby rotation of the ball screw drives the second ball nut at a speed which is selectively different from the speed of the first ball nut.

Preferably also, the ball screw is driven by a DC electric or other type of variable speed motor. A disconnect device is mounted to disconnect the ball screw from the motor in case a torque overload is placed upon the ball screw, such as may occur in the event of a crash or other mishap.

In a preferred embodiment of the invention, the first and second workpiece displacement means respectively comprise first and second transfer bars, or transfer bar pairs, employed in a transfer machine. The power transmission train is configured so that when the ball screw is rotated during a transfer cycle, the second ball nut is rotated at a speed which is substantially less than the rotational speed of the ball screw while the first ball nut is fixed against rotation. Consequently, the second carriage is translated through a distance which is substantially less than the distance through which the first carriage is translated during the cycle. The first and second transfer bars or bar pairs are directly linked to the first and second carriages, respectively, whereby the first and second transfer bars or pairs are provided with the capability of displacing different groups of workpieces by substantially different amounts during the same transfer cycle.

OBJECT OF THE INVENTION

An object of the present invention is to provide an improved transfer mechanism for use in a system which comprises multiple workpiece processing stations, wherein the transfer mechanism must be capable of moving different workpieces over different distances between stations during the same transfer cycle.

Another object is to provide an improved transfer drive, for a transfer machine or the like, of the type which includes a DC electric or other type of variable speed motor as its primary power source, and which employs a screw and nut mechanism, such as a ball screw and associated ball nuts, as a power transmission element.

Another object is to provide a transfer drive of the above type wherein the motor becomes disconnected from other components of the drive in the event of torque overload upon the ball screw.

Another object is to provide a transfer drive of the above type which includes a torque overload disconnect device which may be quickly reset by an operator, following activation of the device due to torque overload on the ball screw, so that operation of the transfer drive may be resumed as soon as the overload condition is cleared.

Another object is to provide a transfer drive of the above type which includes two or more carriages, which are simultaneously translated by rotation of the ball screw, at speeds which are selectively different from one another, each of the carriages being linked to drive a transfer bar of the transfer machine.

These and other objects of the invention will become more readily apparent from the ensuing specification when taken together with the drawings.

BRIEF DESCRIPTION OF THE DRAWINGS

FIGS. 6 and 7 are sectional views showing the power disconnect device of FIG. 3 in connect and disconnect modes, respectively.

DESCRIPTION OF THE PREFERRED EMBODIMENT

Figure 1:
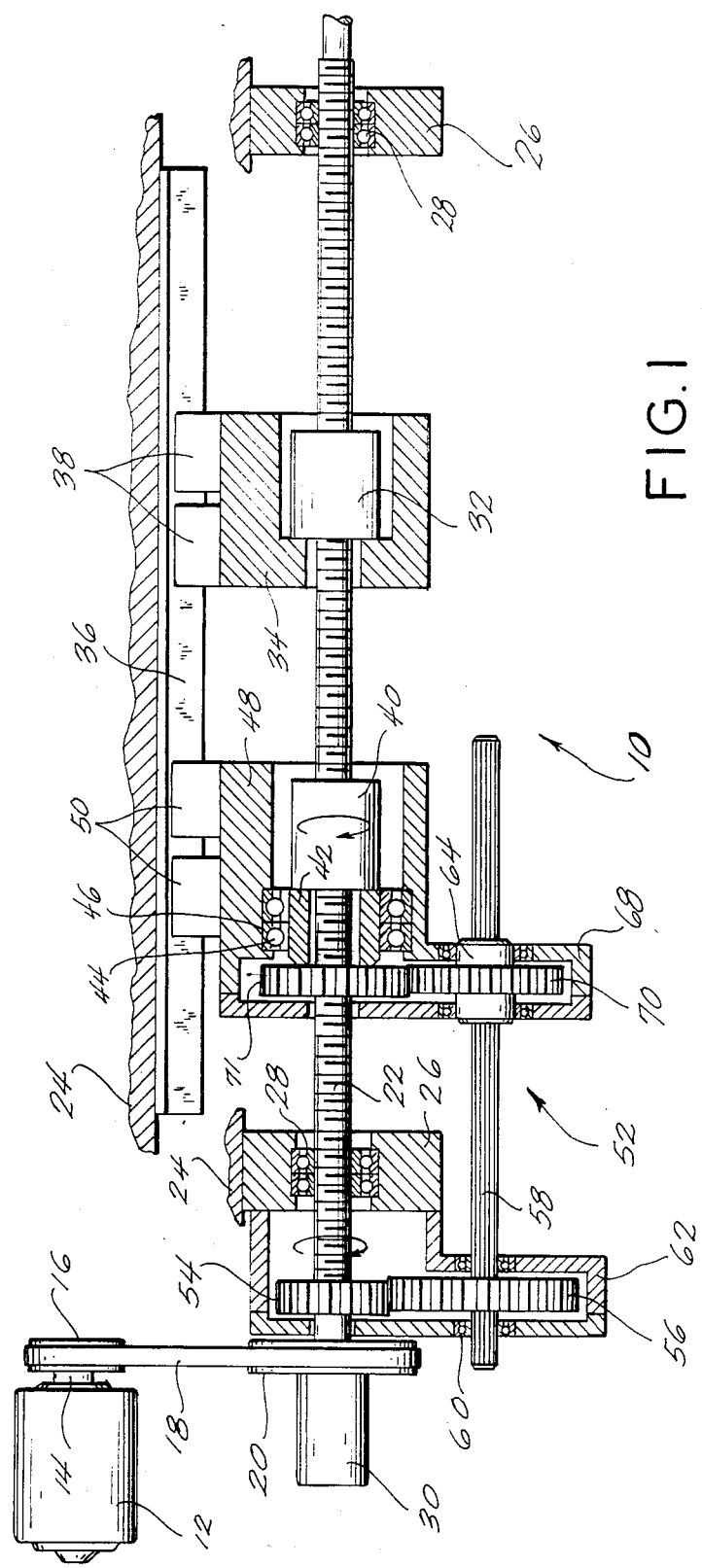
FIG. 1 is a broken sectional view showing an embodiment of the invention in a simplified form for purposes of illustration.

Referring to FIG. 1, there is shown a dual stroke transfer drive 10 which is configured to simultaneously drive two transfer bars in a transfer machine or the like. During each transfer cycle, one of the bars must move a number of workpieces over comparatively great distances, such as between work stations of the machine. At the same time, the other bar must move one or more other workpieces over short distances, such as between processing positions within the same work station. For example, if the workpieces comprise blocks for 4-cylinder engines and one of the work stations comprises a 2-spindle boring machine, one of the transfer bars may have to be driven during a transfer cycle to move a block into the boring machine from the preceding work station of the transfer machine. The displacement of the block in such operation may be on the order of feet. However, after two cylinder holes have been formed in the block by the boring machine, the block may have to be displaced by a distance which is only on the order of inches, so that the other two cylinder holes can be bored. After the block has been completely processed by the boring machine, it may again have to be moved over a distance which is on the order of feet, to the next-following work station.

FIG. 1 shows transfer drive 10 provided with a variable speed motor 12, which drives an output shaft 14 and a pulley 16 joined thereto. While an electric AC or DC motor is usefully employed for motor 12, motor 12 may also be a hydraulic or other power source without departing from the intent of the invention. Generally, motor 12 may comprise any type of power source which can be operated to rotate shaft 14 with a desired velocity and acceleration, and which is adaptive to controllably vary shaft velocity and acceleration. An endless belt 18 engages pulley 16 and also a pulley 20, so that activation of motor 12 causes pulley 20 to be rotated with velocity and acceleration which are directly determined by the velocity and acceleration, respectively, of output shaft 14. If motor 12 comprises an electric AC or DC motor, the velocity and acceleration of shaft 14 are readily controlled by the electrical input which is applied to motor 12.

Transfer drive 10 further includes a ball screw 22, which is mounted for rotation within a rigid frame 24 by means of thrustblocks 26, joined to frame 24, and by means of bearings 28 which are mounted within the thrustblocks. For purposes of simplification, FIG. 1 shows only portions of frame 24 which come in contact with various components of drive 10. Usefully, thrustblocks 26 and bearings 28 are positioned proximate to each end of ball screw 2. Power is transmitted to rotate ball screw 22, in both clockwise and counterclockwise directions of rotation, through a torque overload disconnect device 30, which may be a device having first and second rotatable members. The first rotatable member is joined to pulley 20, the second rotatable member is joined to ball screw 22, and a mechanism mounted between the members transmits power from the first member to the second member to rotate ball screw 22 when the torque applied to ball screw 22 is less than a pre-specified maximum limit. When such limit is exceeded, however, the mechanism uncouples the first and second members so that power is no longer transmitted to ball screw 22. Disconnect device 30 may comprise, for example, a commercially available product known as the Autogard 400, which is manufactured by American Autogard Corporation. It is to be noted that "Autogard" is a registered trademark.

In an alternative embodiment, in which disconnect device 30 is not used, pulley 20 is fixably joined to the end of ball screw 22, to directly drive ball screw 22 in response to activation of motor 12.

Referring further to FIG. 1, there is shown a ball nut 32 having threads which are in engaging relationship with threads of ball screw 22. Ball nut 32 is rigidly attached to a carriage structure or carriage 34 which is disposed to translate, or move linearly, along a guide rail 36. Guide rail 36 is joined to frame 24 in parallel relationship with ball screw 22, and carriage 34 is mounted upon guide rail 36 by means of guide rail bearings 38, which are of any conventional design suitable to allow the aforesaid translational movement of carriage 34. Ball nut 32 and carriage 34 are constrained against rotational movements by means of bearings 38 and rail 36, so that rotation of ball screw 22 causes ball nut 32 and carriage 34 to be translated along guide rail 36. The direction, velocity and acceleration of translation of carriage 34 is thereby determined directly by the direction, velocity and acceleration, respectively, of the rotation of output shaft 14 of motor 12.

In like manner with ball nut 32 and carriage 34, a ball nut 40 having threads in engaging relationship with threads of ball screw 22 is rotatably mounted by means of a sleeve 42, which is immovably joined to ball nut 40, and by means of bearings 44 in which sleeve 42 is journaled. Bearings 44 are retained in a race or the like 46, which is immovably joined to a carriage 48. Carriage 48 is constrained to translate along guide rail 36 by means of guide rail bearings 50, which are similar or identical to bearings 38. Consequently, rotation of ball screw 22 directly drives ball nut 40 to move carriage 48, as well as carriage 34, along guide rail 36. However, ball nut 40 is also indirectly driven by ball screw 22, by means of a secondary power train 52.

Power train 52 includes a gear 54 which is joined to ball screw 22 and rotates therewith, gear 54 being in meshed relationship with a gear 56 so that rotation of gear 54 in one direction causes gear 56 to be rotated in the opposite direction. Gear 56 is joined to a splined shaft 58, which is journaled in parallel relationship with ball screw 22 by means of bearings 60. Bearings 60 are mounted in a case 62 which is supported by frame 24. A hub 64 is provided with a set of internal teeth (not shown) which are fitted around splined shaft 58 in meshed, slip-fitting relationship. Hub 64 is thereby driven by rotation of shaft 58, and at the same time may be translated therealong. Hub 64 is journaled in bearings mounted in a case 68, which is supported by and movable with carriage 48. An external gear 70 is mounted upon hub 54 and has teeth in meshed relationship with a gear 71, which is rigidly attached to sleeve 42. Sleeve 42 is thereby driven to rotate ball nut 40 when gear 70 drives gear 71 in response to rotation of hub 64.

It will be readily apparent that if ball screw 22 is rotated for a specified period of time, carriage 34 will be moved through a distance which is determined by (1) the length of the time period and (2) the rotational speed of the ball screw. However, the distance through which carriage 48 moves during the same period, in addition to such parameters, is determined by the ratio between driving gear 54 and driven gear 56 of secondary power train 52, and the ratio between driving gear 70 and driven gear 71 thereof. By judicious selection of all of such parameters, rotation of the ball screw 22 during the time period of a forward or backward stroke of a transfer cycle will displace carriage 34 a distance which is on the order of feet. Other selections of the parameters may of course be made to achieve other desired relationships between the displacements of carriages 34 and 48.

The ratio between the distance moved by carriage 34 to the distance moved by carriage 48 may usefully be selected from a range having a lower limit on the order of one to one, and an upper limit on the order of twelve to one. However, reference to such range is by no means intended to place any limit upon the distances which may be moved by carriages 34 and 48 during forward and backward strokes.

It is to be noted that while FIG. 1 shows a secondary power train 52 which has a particular configuration, it is anticipated that numerous other configurations thereof are also possible, all of which are in keeping with the invention. It is also anticipated that in other embodiments of the invention, three or more carriages may be positioned along the length of the ball screw, one of them being driven directly by ball screw rotation, in the manner of carriage 34, and each of the others being driven indirectly, through its own secondary power transmission train.

It is to be further noted that other screw and nut mechanisms and arrangements could be substituted for those shown in FIG. 1. For example, it is not necessary to the invention that screw 22 is a ball screw, or that nuts 32 and 40 are ball nuts.

Figure 2:
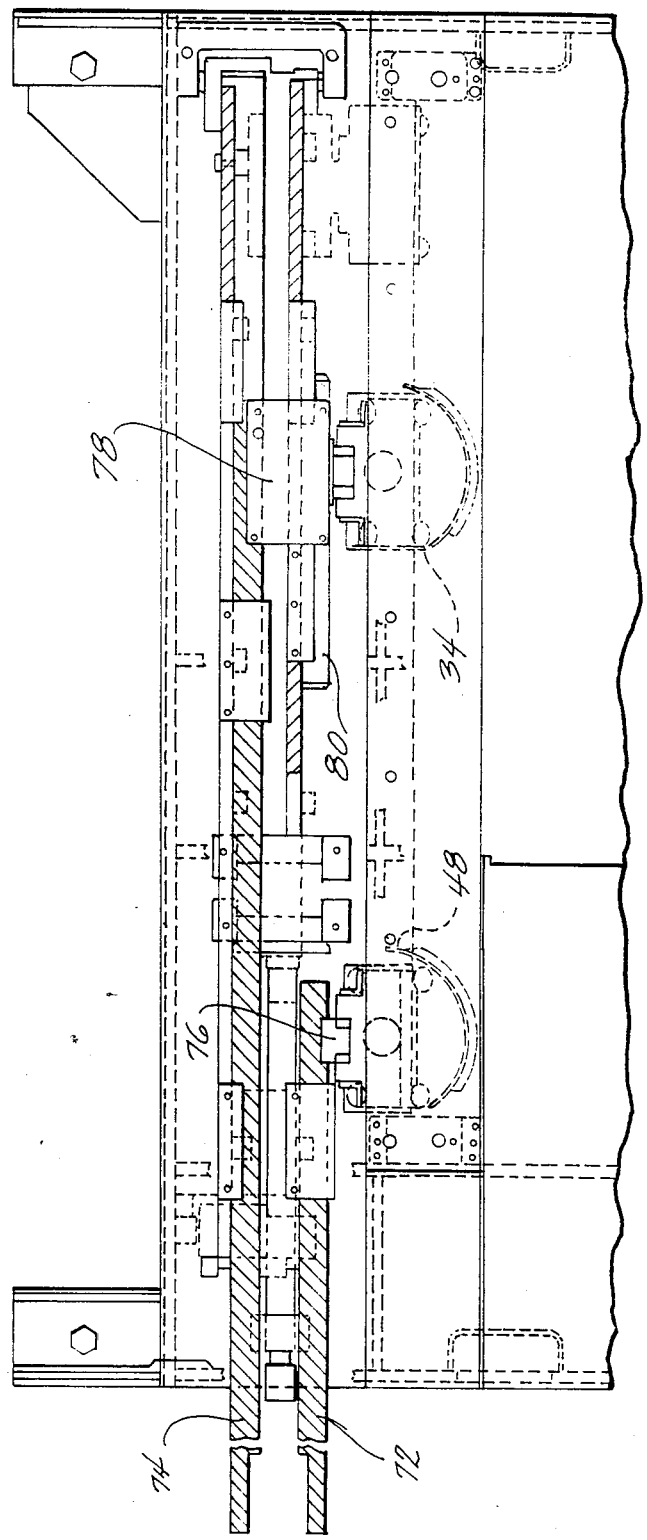
FIG. 2 is a view showing the carriages of FIG. 1 in working relationship with transfer bars of a conventional transfer machine.

Referring to FIG. 2, there are shown transfer bars 72 and 74, which are mounted in a transfer machine by any conventional means for moving workpieces through the transfer machine during successive transfer cycles. For example, transfer bar 72 is conventionally mounted so that during the forward stroke of each transfer cycle, transfer bar 72 relocates workpieces within work stations of the transfer machine, such workpieces being displaced distances which are on the order of inches. Transfer bar 74, on the other hand, is mounted to move other workpieces over distances on the order of feet during the forward strokes. Transfer bar 74 is mounted, for example, to move one or more workpieces between work stations during a transfer cycle.

Referring further to FIG. 2, there is shown transfer bar 72 linked to carriage 48 by means of a transfer plate 76. Transfer bar 72 and carriage 48 are therefore displaced in unison during successive transfer cycles. In like manner, transfer bar 74 is joined to carriage 34 by means of a transfer plate 78, and is displaced in unison therewith. Because of the comparatively large size of transfer plate 78, a bar 80 may be provided to partially support transfer plate 78, plate 78 traversing supporting bar 80 during successive transfer cycles.

Figure 3:
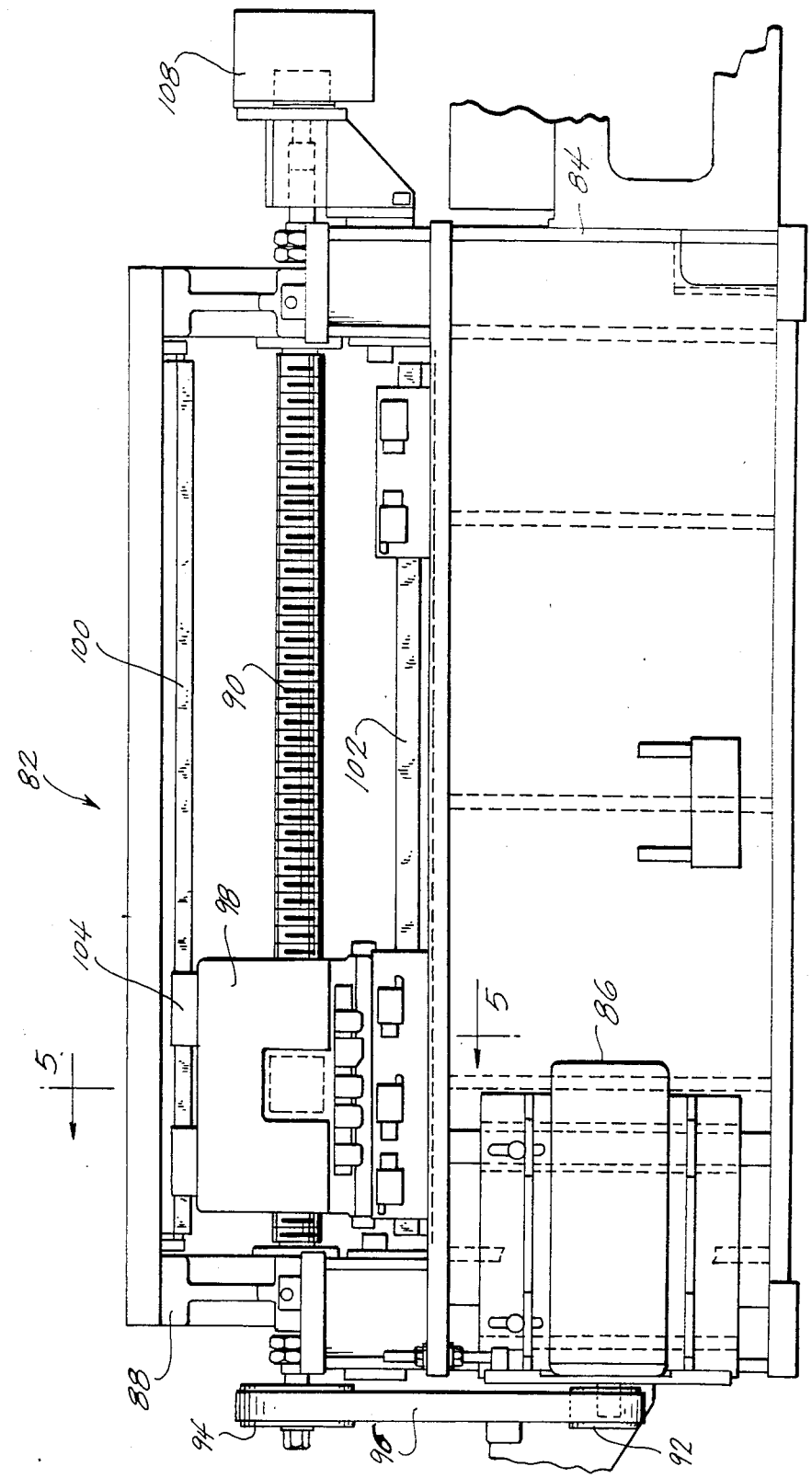
FIG. 3 is a side elevational view showing a carriage which is similar or identical to one of the carriages of FIG. 1, together with a power disconnect device.

Referring to FIG. 3, there is shown a ball screw transfer drive 82, which includes a bed or base 84 for supporting a variable speed motor of selected type and a frame 88. A ball screw 90 is journaled in the frame, and is selectively rotated by activation of motor 86, power being transmitted from motor 86 to ball screw 90 through a pulley 92 fixed to the output shaft of motor 86, a pulley 94 fixed to an end of the ball screw, and a driving belt 96 which is connected between pulleys 92 and 94. As aforestated, by employing a DC electric or other type of variable speed motor to drive ball screw 90, the direction, velocity and acceleration of ball screw rotation may be very closely controlled.

Referring further to FIG. 3, there is shown a carriage 98, which is mounted for translational movements along an upper guide rail 100 and a lower guide rail 102 by means of guide rail bearings 104. Guide rails 100 and 102 are rigidly joined to frame 88 in parallel relationship with ball screw 90. A torque overload disconnect device, hereinafter described, enables power to be transmitted from ball screw 90 to carriage 98 in order to translate carriage 98 along guide rails 100 and 102 with direction, velocity and acceleration which are directly related to the direction, velocity and acceleration, respectively, of ball screw rotation. An encoder or resolver 108, or like device, is mounted to the end of ball screw 90 which is opposite to the end to which pulley 94 is joined. Device 108 is provided to couple information pertaining to ball screw rotation to an electrical controller directing the operation of drive 82. Alternatively, a linear encoding device capable of supplying the electrical controller with information about the translational position of the carriage 98, could be mounted to the frame 88.

Figure 4:
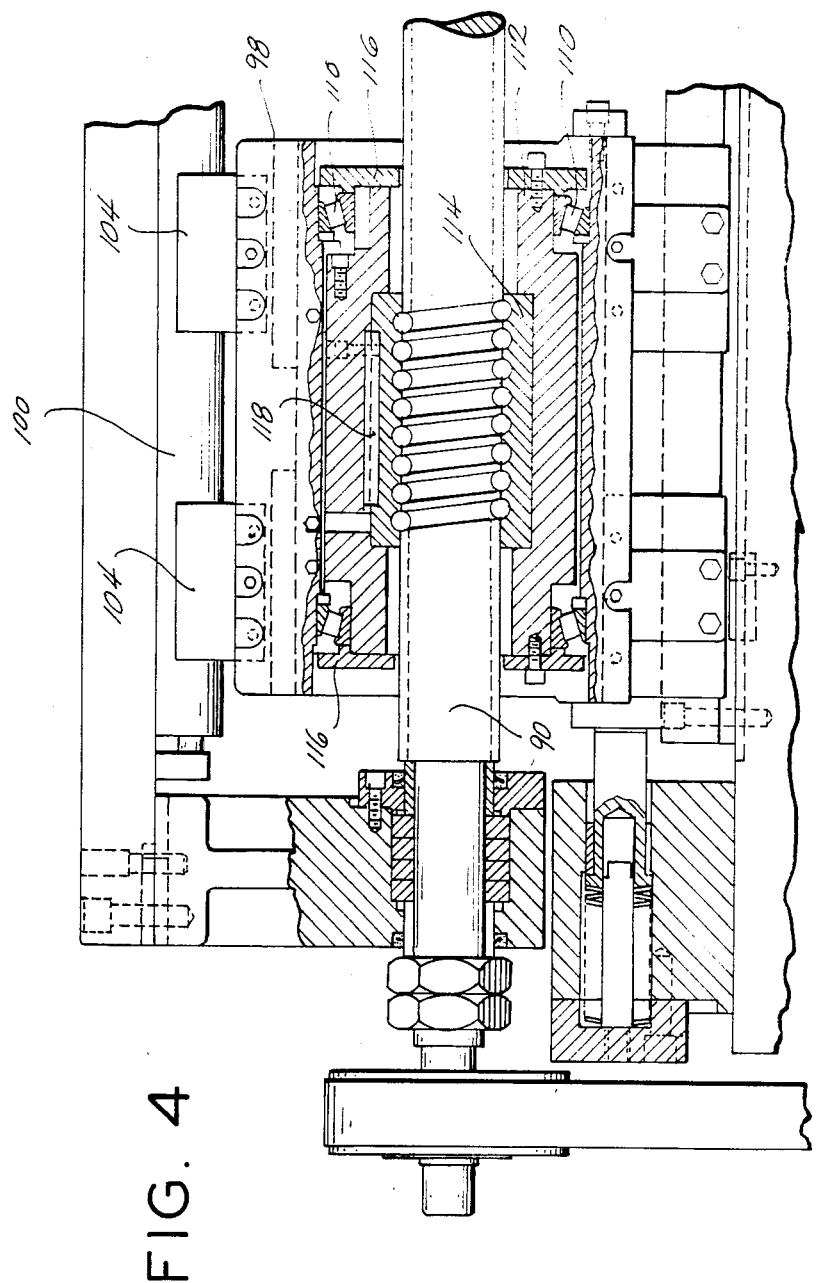
FIG. 4 is a side elevational view of the carriage of FIG. 3.

Referring to FIG. 4, there are shown bearings 110 supported within carriage 98 for journaling a ball nut housing 112, housing 112 enclosing a ball nut 114 which has its threads in engaging relationship with threads of ball screw 90. Ball nut housing 112 is retained upon bearings 110 by means of bearing retainer caps 116, and a key 118 is provided between housing 112 and ball nut 114, so that housing 112 and ball nut 114 must rotate in unison. Consequently, if either housing 112 or ball nut 114 becomes locked to carriage 98, rotation of ball screw 90 causes carriage 98 to translate along the ball screw. On the other hand, if neither ball nut housing 112 nor ball nut 114 is locked to carriage 98, rotation of ball screw 90 causes housing 112 to rotate upon bearings 110, and carriage 98 does not move.

Figure 5:
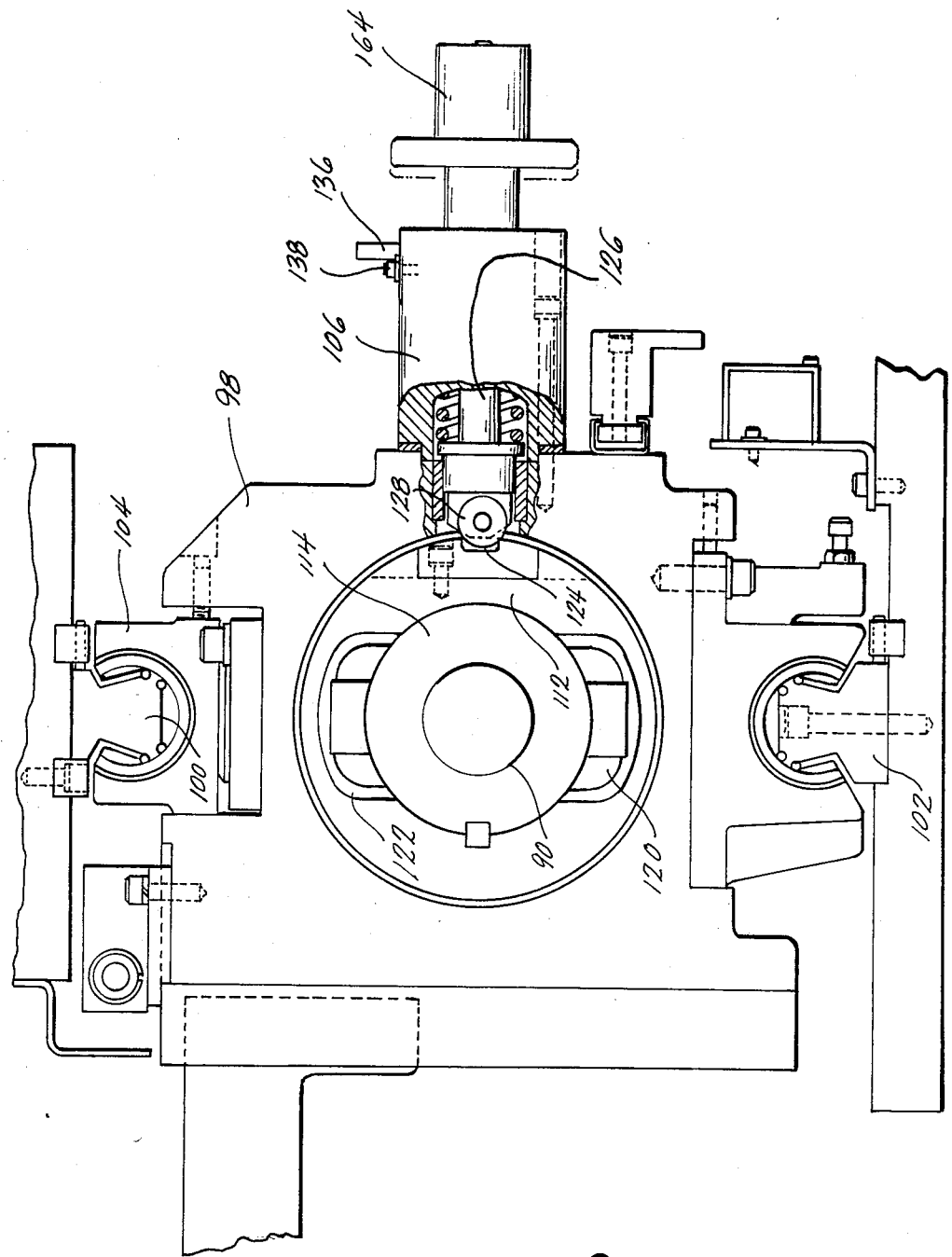
FIG. 5 is a sectional view taken along lines 5—5 of FIG. 3.

Referring to FIG. 5, there is shown a ball nut return tube 120 and a clearance tunnel 122 for ball nut 114. There is further shown an outwardly facing notch 124 provided in ball nut housing 112 which may be brought into alignment with a shaft 126, of a disconnect device 106, by rotation of housing 112 upon bearings 110. When notch 124 and shaft 126 are in alignment and shaft 126 is in an extended position, a roller 128, joined to the end of shaft 126, is urged into notch 124 with sufficient force to prevent rotation of ball nut housing 112 relative to carriage 98. Device 106 is then in a connect mode, that is, it is operative to cause motive power to be coupled from ball screw 90 to carriage 98. When roller 128 is withdrawn from notch 124, by backward movement of shaft 126, device 106 is placed in a disconnect mode, since housing 112 and ball nut 114 become free to rotate relative to carriage 98, upon bearings 110. Power provided by rotation of ball screw 90 is thereby uncoupled from carriage 98.

Referring to FIGS. 6 and 7 together, there is shown disconnect device 106 in its connect and disconnect modes, respectively. Device 106 includes a case 130 which is rigidly joined to carriage 98 by means of bolts 132 or the like. Shaft 126 projects outwardly from case 130, through an aperture provided in the rearward end thereof, and a slot 134 is provided in shaft 126 for receiving a pin 136, which is secured to case 130 by means of a screw 138. The dimensions of slot 134 relative to the dimensions of pin 136 are such that rotary movements of shaft 126 are prevented, and axial movements of shaft 126 are limited to a pre-specified range.

When device 106 is in a connect mode, as shown in FIG. 6, a spring 140 is in a partially compressed condition, spring 140 being positioned around shaft 126 between a flange 142 which is joined to shaft 126, and an annular internal spacer 144 provided in case 130. Spring 140 urges roller 128 into notch 124 with a force determined by the thickness of spacer 144 to lock ball nut 114 and housing 112 to carriage 98, as aforestated. However, if the torque exerted upon housing 112 by ball screw 90 becomes sufficiently high, the force exerted on shaft 126 and roller 128 by spring 140 will be overcome, and roller 128 will be forced out of notch 124 as housing 112 is rotated by the torque. Shaft 126 will be moved backwardly, spring 140 will be further compressed between flange 142 and face 144, and ball nut 114 and housing 112 will become free to rotate. By judicious selection of spring 140 and spacer 144, spring 140 will be overcome right when the torque of ball screw 90 reaches a pre-specified level, for example, a level which indicates that an undesirable overload condition has been placed upon the ball screw.

If shaft 126 and roller 128 are driven backwardly by an excessive amount of torque acting upon ball nut housing 112 as aforestated, it is very important to prevent an uncontrolled return movement of the shaft and roller. Otherwise, roller 128 and notch 124 would repeatedly move into and out of engaging relationship, during successive revolutions of housing 112. Consequently, disconnect device 106 is provided with a shaft locking device 146. Device 146 includes a cylindrical supporting member 148, which is fitted around shaft 126 and joined to case 30, and further includes a cylindrical slidable member 150, which is mounted around supporting member 148, so as to enable axial displacement of member 150 relative to member 148. The left side of slidable member 150, as viewed in FIGS. 6 and 7, has an enlarged inner diameter which cooperates with an enlarged outer diameter of supporting member 148 to enclose a spring 158. Spring 158 serves to wedge slide 150 to the right, as viewed in FIGS. 6 and 7.

Referring further to FIGS. 6 and 7, there is shown a supporting reduced diameter portion 151 formed on the right end of supporting member 148, portion 151 being provided with radial holes 153 for receiving balls 154 which have a diameter that is greater than the thickness of the wall of reduced diameter portion 151 so that a portion of balls 154 always protrude out of the holes 181. The balls are sized in relation to indentations 152, provided in an annular surface 155 of slidable member 150 which is in sliding engagement with the periphery of reduced diameter portion 151, so that the protruding portion of each of the balls 154 is receivable into one of the indentations 152.

When device 106 is in its connect mode, balls 154 are in engagement with the periphery of shaft 126 at some distance to the right, as shown in FIG. 6, of an annular groove 156 formed in shaft 126. Balls 154 are partially received into indentations 152, and shaft 126 is constrained against axial movement only by the force of spring 140. However, when such force is overcome by excessive torque acting upon ball nut housing 112, shaft 126 is driven backwardly until annular groove 156 aligns with the balls 154. Thereupon, the space of groove 156 becomes available for receiving the balls 154, and spring 158 operates to shift slidable member 150 to the right as viewed in FIG. 7, up to a stop 160. As spring 158 moves slidable member 150, balls 154 are depressed through radial holes 153 so that a portion of each ball is in groove 156, and another portion is in a hole 153 of supporting member 148. In such position, balls 154 lock shaft 126 against supporting member 148, preventing further axial movement of the shaft. With indentations 152 moved out of alignment with balls 154, annular surface 155 of slidable member 150 retains the balls in their respective locking positions.

After a torque overload condition has been removed from ball screw 90, shaft 126 must be released so that device 106 can return to its connect mode. To release shaft 126, it is necessary to move slidable member 150 forwardly, i.e., toward ball nut housing 112 and against spring 158, whereby balls 154 will re-enter indentations 152 and be withdrawn from groove 156. The strength of spring 158 is such that slidable member 150 can be moved manually by an operator. However, shaft 126 will not be released unless notch 124 and roller 128 are in alignment at the same time that member 150 is moved forwardly. To avoid the need for two operators, one to hold slidable member 150 in its forward position, and the other to manually rotate housing 112 until notch 124 and roller 128 align, a groove 162 is formed in shaft 126, and a handle 164 is mounted around the end portion of shaft 126. Handle 164 is slidably movable along shaft 126, between an end plate 166 and a forward position which is indicated in FIG. 6 by phantom line 168. End plate 166 is secured to the end of shaft 126 by a screw 170 or the like.

To bring notch 124 and roller 128 back into engaging relationship, an operator slides handle 164 to its forward position 168. An annular face 172 of handle 164 is thereby brought into abutting relationship with a matching annular face 174 of slidable member 150, so that slidable member 150 is moved to bring indentations 152 into alignment with balls 154. When handle 164 reaches forward position 168, spring plungers 176 provided in handle 164 engage groove 162 of shaft 126, whereby locking device 146 is maintained in its deactivated condition without further action by the operator. The operator is then free to manually rotate housing 112 until roller 128 and notch 124 come into alignment. Thereupon, spring 140 will move shaft 126 forwardly to urge roller 128 into notch 124, spring 140 being of sufficient strength to overcome the holding force of spring plungers 176. Forward movement of shaft 126 moves groove 156 out of alignment with balls 154, and causes the balls to be moved into their respective indentations 152.

Obviously, many modifications and variations of the present invention are possible in the light of the above teachings. It is therefore to be understood that within the scope of the disclosed inventive concept, the invention may be practiced otherwise than as specifically described.

What is claimed is:

1. Mechanical drive apparatus for moving first and second members simultaneously but different distances relative to a frame, said apparatus comprising:
a driving screw rotatably supported by said frame;
a means for rotating said screw;
a first nut in threaded engagement with said screw;
means for coupling said first movable member to said first nut for movement with said first nut along said screw;
a second nut in threaded engagement with said screw;
means for mounting said second nut for rotation relative to said screw;
means for coupling said second movable member to said second nut movement with said second nut along said screw; and
means actuated by the rotation of said screw for rotating said second nut while said screw is being rotated so that said second nut and said second movable member move at a different rate of travel and a different distance along said screw than said firstnut and said first movable member.

2. The apparatus of claim 1 wherein:
said drive means comprises a gear train connected at one of its ends to said screw, and the other of its ends to said second nut so that rotation of said screw actuates said gear train for rotating said nut.

3. The apparatus of claim 1 wherein:
said screw rotation means comprises a variable speed motor responsive to an input signal to selectively vary the velocity and acceleration of rotation of said screw.

4. The apparatus of claim 1 wherein:
said driving screw comprises a ball screw, and said first and second nuts comprise ball nuts.

5. The apparatus of claim 1 wherein said apparatus includes:
first means for joining said first movable member to a first transfer machine transfer bar so that said first movable member and said first transfer bar translate in unison over a first distance; and
second means for joining said second movable member and a second transfer machine transfer bar so that said second movable member and said second transfer bar translate in unison over a second distance.

6. The apparatus of claim 1 wherein:
said means for coupling said first movable member to said first nut includes means for uncoupling said first nut and said first movable member when a level of torque is applied to said screw which exceeds a prespecified level.

7. In a machine tool a transfer drive moving a first workpiece transfer bar over a first distance and simultaneously moving a second workpiece transfer bar over a second distance which is different from the first distance, the transfer drive of a type-having: a frame; a motor; a first carriage; means for mounting the first carriage for reciprocating movement relative to the frame; means for fixably joining the first carriage to the first transfer bar; a second carriage; means for mounting the second carriage for reciprocating movement relative to the frame; means for fixably joining the second carriage to the second transfer bar; and means for reciprocating the first carriage at a first rate related to the first distance and simultaneously reciprocating the second carriage at a second rate related to the second distance, wherein said means for reciprocating the first and second carriages comprises;
a first nut fixed to said first carriage;
a second nut;
means for rotatably mounting said second nut to said second carriage;
a driving screw engaging said first nut and said second nut;
means for rotatably mounting said driving screw relative to said frame;
means for controlling said motor to said driving screw to rotate said driving screw at a rate functionally related to said first rate of reciprocation; and
means for rotating said second nut comprising a first driving gear mounted for rotation with said driving screw; a rotatable first driven gear in meshed relationship with said first driving gear; a rotatable second driving gear; means connecting said first driven gear and said second driving gear for rotation in unison; and a second driven gear in meshed relationship with said second driving gear and joined for rotation in unison with said second ball nut, the ratio between said first driving gear and said first driven gear and the ratio between said second driving gear and said second driven gear being respectively selected to establish said second rotational rate of said second nut.

8. The transfer drive of claim 7 wherein:
said means for connecting said first driven gear and said second driving gear comprises a spline oriented in parallel relation with said driving screw, said second driving gear and said second driven gear mounted for movement along said spline with said second nut.

9. The transfer drive of claim 7 wherein:
said driving screw comprises a ball screw; and
said first and second nuts respectively comprise ball nuts.

10. A transfer drive for a machine tool comprising:
a ball screw mounted for rotation;
first and second carriages, each of said carriages mounted for translational movement in parallel relation with the axis of said ball screw;
a first ball nut journaled in bearings upon said first carriage and having a notch of selected dimensions, said first ball nut having threads in engaging relation with threads of said ball screw;
a second ball nut journaled in bearings upon said second carriage, said second ball nut having threads in engaging relation with threads of said ball screw;
means for rotating said ball screw;
means mounted between said ball screw and said second ball nut for rotating said second ball nut to maintain a pre-specified relationship between distances traversed by said first and second carriages during a rotation of said ball screw;
a shaft mounted for reciprocation between forward and rearward positions and having a forward end adjacent to said notch of said first ball nut when said first ball nut is in a critical angular orientation relative to said first carriage and said first shaft is reciprocated to said forward position;
a roller joined to said forward end of said shaft and receivable into said notch to prevent rotation of said first ball nut with respect to said first carriage;
means for urging said roller into said notch when the torque applied to said first ball nut is less than a pre-specified torque level, and allowing said first ball nut to rotate away from said roller when said roller is received into said notch and the torque applied to said first ball nut exceeds said pre-specified torque level;
primary locking means proximate to said shaft and activated by reciprocation of said shaft to said rearward position for locking said shaft in said rearward position; and
secondary locking means proximate to said shaft for simultaneously locking said shaft in said rearward position and de-activating said primary locking means.

11. The apparatus of claim 10 wherein:
said means for urging said roller into said notch comprises a spring having sufficient force to overcome said secondary locking means to move said roller into said notch when said roller and said notch are in alignment and said primary locking means is de-activated.

* * * * *